United States Patent
Zubieta et al.

(10) Patent No.: US 9,935,544 B2
(45) Date of Patent: Apr. 3, 2018

(54) METHOD FOR POWER TRANSFER BETWEEN DC CIRCUITS

(71) Applicant: Arda Power Inc., Oakville, Ontario (CA)

(72) Inventors: Luis Zubieta, Oakville (CA); Damien Frost, Oakville (CA)

(73) Assignee: Arda Power Inc., Oakville, Ontario (CA)

( * ) Notice: Subject to any disclaimer, the term of this patent is extended or adjusted under 35 U.S.C. 154(b) by 0 days.

(21) Appl. No.: 14/243,525

(22) Filed: Apr. 2, 2014

(65) Prior Publication Data
US 2014/0292303 A1    Oct. 2, 2014

Related U.S. Application Data

(60) Provisional application No. 61/807,385, filed on Apr. 2, 2013.

(51) Int. Cl.
*H02M 3/07* (2006.01)
*H02M 3/158* (2006.01)
*H02M 3/155* (2006.01)

(52) U.S. Cl.
CPC ............ *H02M 3/158* (2013.01); *H02M 3/07* (2013.01); *H02M 3/155* (2013.01)

(58) Field of Classification Search
CPC . H02M 2001/0067; H02M 2001/0074; H02M 2001/0077; H02M 3/158; H02M 3/04; H02M 3/06; H02M 3/07; H02M 3/145; H02M 3/155; H02M 3/156; H02M 3/1582; H02M 2003/071; H02M 2003/072; H02M 2003/1552

USPC ....... 323/267, 268, 271, 272, 282–290, 351, 323/355
See application file for complete search history.

(56) References Cited

U.S. PATENT DOCUMENTS

| | | | | |
|---|---|---|---|---|
| 7,511,463 | B2* | 3/2009 | Kumar | H02M 3/158 323/267 |
| 2011/0254528 | A1* | 10/2011 | Danesh-Pajooh-Nejad | H02M 3/33584 323/311 |
| 2012/0287690 | A1* | 11/2012 | Paatero | H02M 7/487 363/134 |
| 2013/0322131 | A1* | 12/2013 | Sun | H02J 3/36 363/35 |
| 2013/0328403 | A1* | 12/2013 | Kaufman | H02J 3/385 307/77 |
| 2014/0160812 | A1* | 6/2014 | Norrga | 363/44 |
| 2015/0097536 | A1* | 4/2015 | Van Kessel | F03B 13/14 323/271 |

* cited by examiner

*Primary Examiner* — Jeffrey Gblende
*Assistant Examiner* — David A. Singh
(74) *Attorney, Agent, or Firm* — Head, Johnson, Kachigian & Wilkinson, PC

(57) ABSTRACT

A method for transferring power between two DC circuits, each circuit being bipolar or connected at the midpoint thereof, involves: coupling the high voltage bus across a pair of inductors, arranged in parallel; coupling the low voltage bus across the pair of inductors; coupling the high voltage bus, the low voltage bus and the inductors by active switches and diodes, to provide for: (i) a storage configuration, wherein energy is transferred from one of the buses and stored in the inductors; and (ii) a release configuration, wherein energy is released from the inductors and transferred to the other of the buses.

19 Claims, 6 Drawing Sheets

METHOD FOR POWER TRANSFER BETWEEN DC CIRCUITS

CROSS-REFERENCE TO RELATED APPLICATIONS

This application claims priority to U.S. Provisional Patent Application Ser. No. 61/807,385, filed Apr. 2, 2013, which is herein incorporated by reference.

BACKGROUND OF THE INVENTION

1. Field of the Invention

The invention relates to the field of DC/DC (direct current to direct current) converters.

2. Prior Art

Bipolar or midpoint grounded DC systems have advantage with respect to negative grounded systems or floating systems, including but not limited to relatively low fault currents during ground faults, relatively low [and safe] potentials to ground and relatively simple and inexpensive instrumentation requirements. This is because the voltage with respect to ground is known and only half of what it would be with a negative grounded system. Bipolar systems also allow for the possibility of loads (or sources) distributed and operating at two different voltages. Accordingly, DC/DC converters, capable of transferring power between two sources grounded at the midpoint, are attractive in emerging applications such as alternative energy systems, energy storage and DC microgrids; a circuit of this type is shown in FIG. 1. This circuit uses four active switches and has some cost and complication associated with the gating circuit.

SUMMARY OF THE INVENTION

Forming one aspect of the invention is a method for transferring power between two DC circuits, each circuit being bipolar or connected at the midpoint thereof. The method comprises the steps of:
  a coupling the high voltage bus across a pair of inductors, arranged in parallel;
  coupling the low voltage bus across the pair of inductors;
  a coupling the high voltage bus, the low voltage bus and the inductors by active switches and diodes, to provide for: a storage configuration, wherein energy is transferred from one of the buses and stored in the inductors; and a release configuration, wherein energy is released from the inductors and transferred to the other of the buses via a freewheeling path through one of the diodes.

DETAILED DESCRIPTION OF THE PREFERRED EMBODIMENTS

Figure 2:
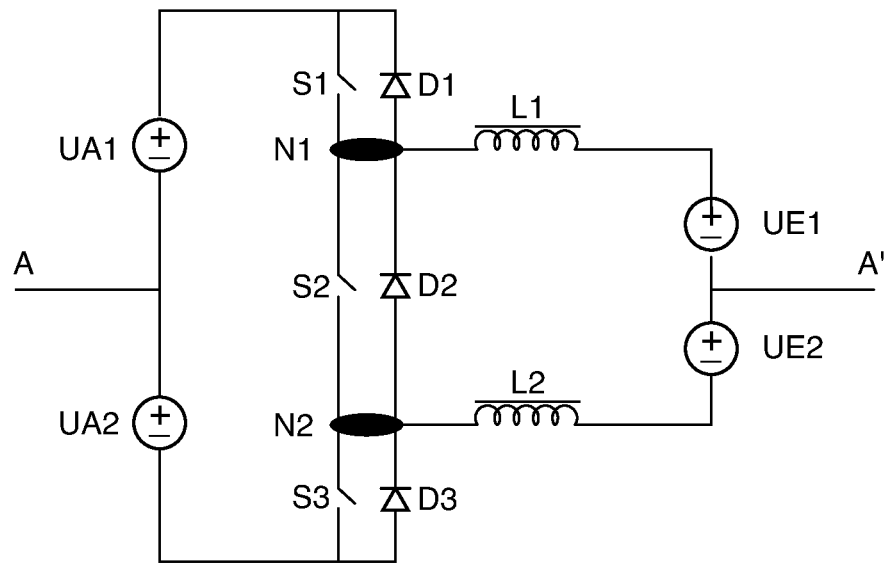
FIG. 2 is a view of a DC/DC converter for bipolar input and output circuits that forms an exemplary embodiment of the invention.

A topology according to the first exemplary embodiment of the invention is shown in FIG. 2 and will be understood to be capable of providing bi-directional power flow between two sources, where both sources are connected at the mid-point.

The circuit operates with the voltage $U_A$ always higher that $U_E$ and for the correct operation, S1 and S3 should have the same gating pattern while S2 has the complementary gating signal.

A represents the midpoint of the high voltage bus; A' represents the midpoint for the low voltage bus. Although in many applications the common midpoint connection would be grounded, it can be connected to some other potential without affecting the circuit performance.

Operation of the Circuit to Transfer Power from $U_A$ to $U_E$

When S1 and S3 are on, energy is transferred from $U_A$ to $U_E$ and stored in both inductors. When S1 and S3 are turned off, the diode in anti-parallel with S2 provides a free-wheeling path for the inductor current. Although not shown, the duty cycle for the switches will be understood to be adjusted by a controller, equivalent to the controller for a half bridge converter as function of the voltage sources $U_A$ and $U_E$.

Operation of the Circuit to Transfer from $U_E$ to $U_A$

When S2 is closed, energy is transferred from $U_E$ to both inductors and stored. When S2 is turned off, the two diodes in anti-parallel with S1 and S3 provide a free-wheeling path for the current circulating on the inductor such that energy is now transferred from $U_E$ plus both inductors into $U_A$. It will be understood by persons of ordinary skill that, in application, additional components [not shown] will be deployed to ensure correct operation of the converter, including but not limited to filter capacitors, sensors and gate drivers.

Advantages

Figure 1:
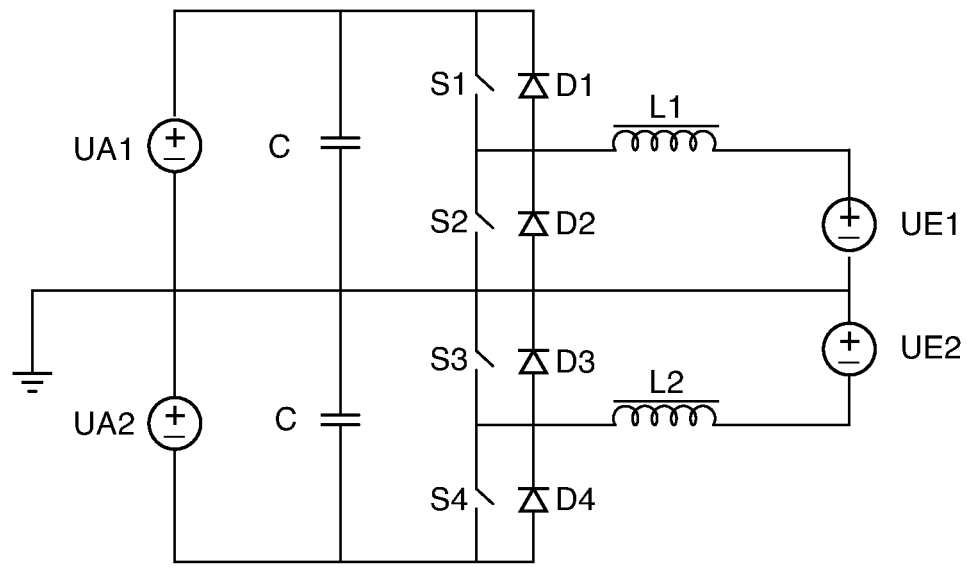
FIG. 1 is a view of a bidirectional DC/DC converter for bipolar input and output.

The proposed topology reduces one active switch, increases the efficiency, and reduces complexity with respect to the half bridge circuit in FIG. 1.

Further, although in theory the same control signal can be provided to S1 and S4 and to S2 and S3 in FIG. 1, in practice there are always differences in the magnitude of $U_{A1}$ and $U_{A2}$ or $U_{E1}$ and $U_{E2}$ or in the value of the inductances or parasitic components on the circuit. Consequently the positive and negative sections of the circuit would not be identical and they would require different operating points to work properly and to provide the required control. Because of that the circuit in FIG. 1 would have to be implemented with independent controllers for the positive and negative sections increasing the cost and complexity. In contrast, the circuit in FIG. 2 is able to operate with a single controller and having the exact same gating signals to S1 and S3.

The circuit will have an automatic "reset" action after S1 and S2 are turned off which will ensure the next cycle (closing of S1 and S3) is always started under the same conditions (inductor current) for the top and bottom circuit. This reset action transfers energy from one of the inductors to the other and/or to the sources and reduces the effect of differences in inductance values, split sources, or parasitic components in the circuit.

Furthermore, the "reset" effect has a self balancing action in some operating conditions that is beneficial to balance the DC-links (on either side of the converter). For example if $U_{A1}$ is slightly higher than $U_{A2}$, when S1 and S3 are turned off, the current on the inductor located on the positive side will be higher than the current on the inductor located on the negative side of the circuit. The difference in energy between inductor will be fed back to $U_{A2}$ (through the diode in anti-parallel with S3) and $U_{E1}$ helping to balance the voltages $U_{A1}$ and $U_{A2}$, this is achieved without the need for a second controller.

The balancing effect mentioned above can be optimized and generalized by adding an energy storage component such as a capacitor in the path joining A with A' such that this components carries the voltage needed to compensate for unbalances in the circuit.

The balancing can also be optimized by using L1 and L2 as coupled inductors to transfer power between the upper and lower circuit as required.

On the other hand, if A and A' are connected, the circulating current in the common connection joining the midpoints of the two sources (A-A') indicates the unbalance in the circuits, and by measuring this current is possible to draw conclusions about the conditions and health of the sources and loads external to the DC/DC converter.

One conclusion that can be drawn from measuring the current flowing from A to A' or the voltage between A and A' (when a component is placed on that path) is to identify possible ground faults in the source circuits UA1, UA2, UE1, or UE2. This allows a quicker detection of the ground fault. Furthermore, if a passive component such as a capacitor is placed in the path joining A with A', it can automatically reduce the short circuit current contribution from one or several of the sources to ground faults in either of the source circuits before the circuit is shut down.

Figure 3:
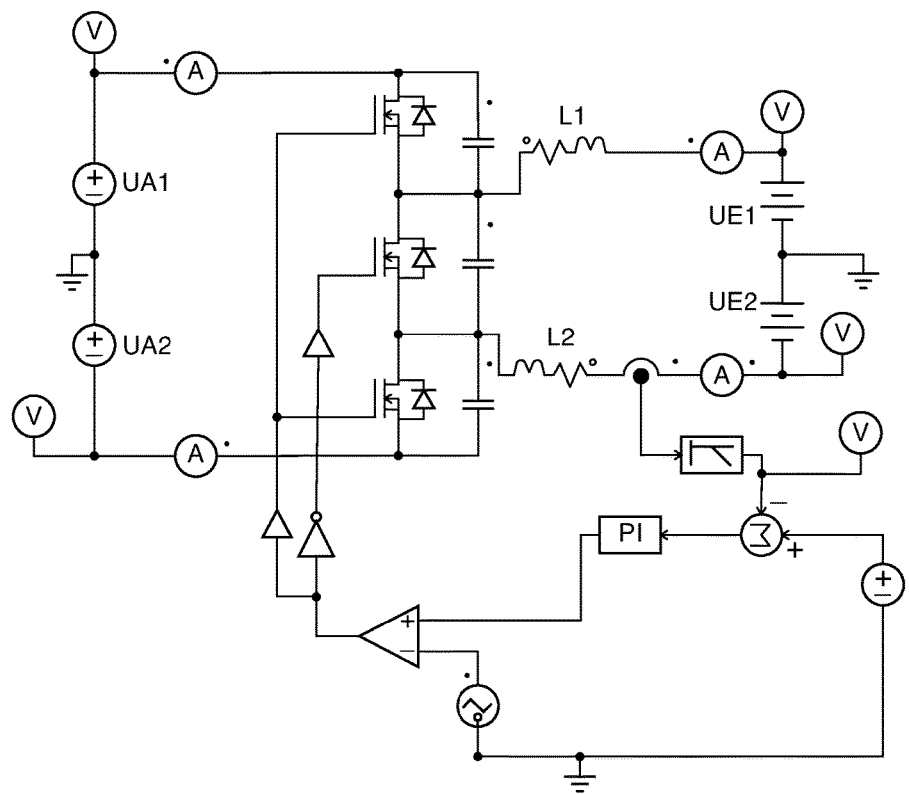
FIG. 3 is a PSIM model of the circuit of FIG. 2.

The circuit for the invention was modeled in PSIM and simulated to verify its operation. The model is shown in FIG. 3. In the simulation, a high voltage source (UA1 and UA2)±400 VDC is used while the low voltage source (UE1 and UE2) is ±200 VDC. The switching frequency for the converter is selected at 5 kHz and each of the two inductors is 5 mH. The converter has at the input and output general bi-directional voltage sources for simplicity, but these sources in practical applications could be batteries, DC generators, loads or other elements of power generation or consumption. The control is a single closed loop controller, using the well known PI control method, and regulating the current on the negative side of the low voltage source. It is clear that, depending on the application, the controller can regulate a current measured in a different part of the circuit or a voltage within the circuit with similar results. The control is set to produce currents of about 12 A in either direction for the low voltage side. These parameters and component values are only an example and represent values that could be expected in a 5 kW DC/DC converter for battery applications. The results are completely scalable to larger or smaller power converters operated at the same or different voltage levels. Different converters would use different devices but the topology is applicable to the full range of powers.

Figure 4:
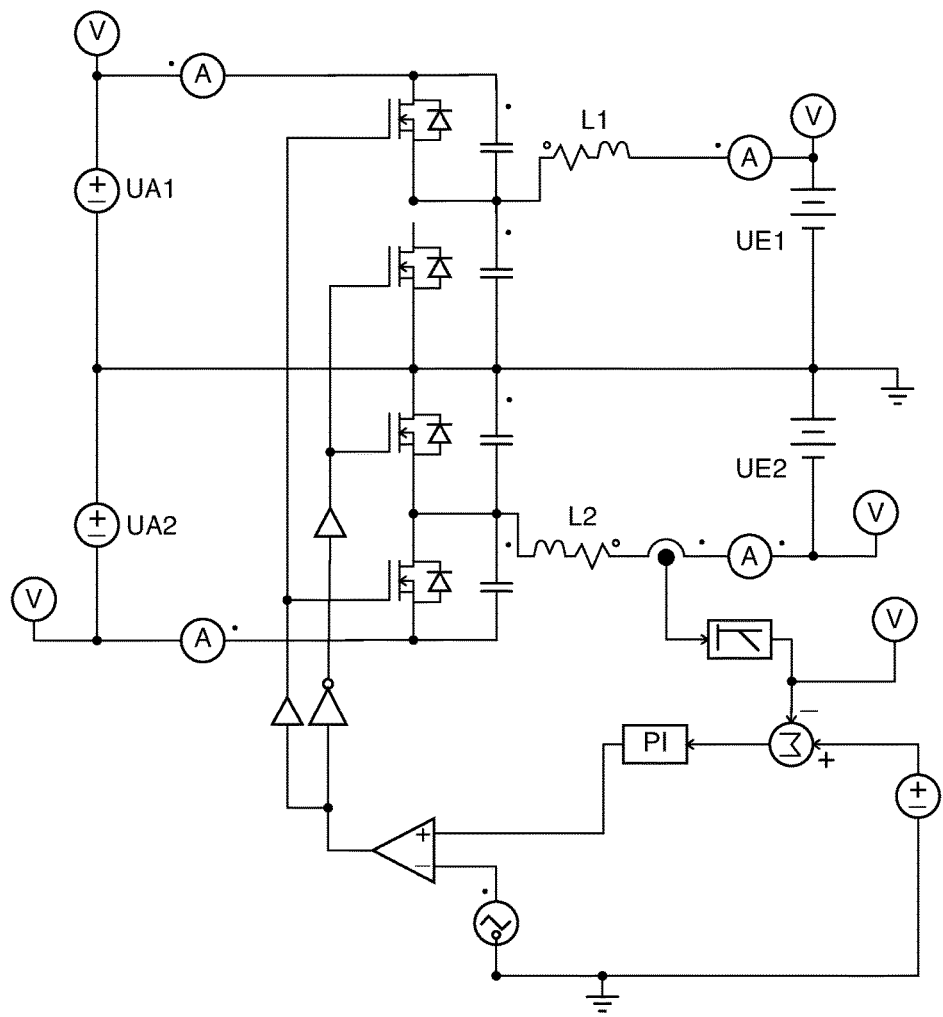
FIG. 4 is a PSIM model of the circuit of FIG. 1.

The circuit is compared with the dual half bridge circuit as shown in FIG. 1. The dual half bridge circuit was also modelled and simulated in PSIM and the model is shown in FIG. 4. Note that the same single controller from FIG. 3 is used in the circuit of FIG. 4 also controlling the negative current.

A simulation was carried out to verify the operation of the two circuits with a small unbalance where UE1 is larger than UE2.

Figure 5:
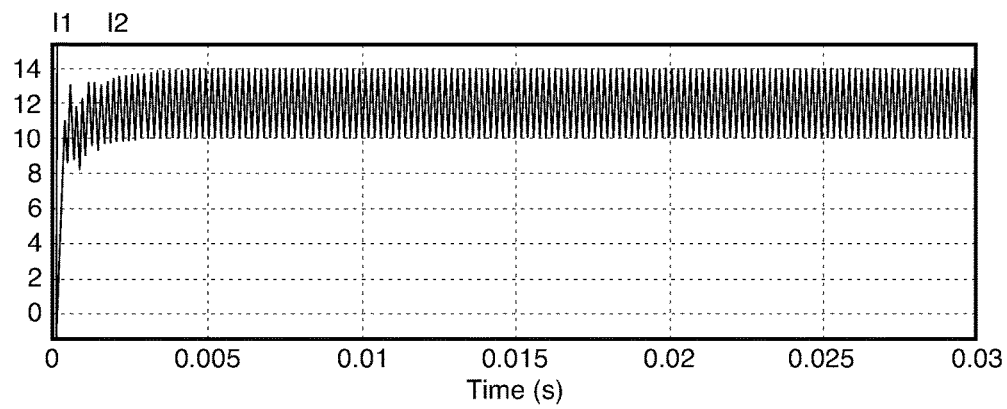
FIG. 5 is a plot of current vs. time created by the model of FIG. 3.

FIG. 5 shows the current through the inductor for the circuit of the invention with UE1 20% higher than UE2. Note that both currents (I1 and I2) are almost identical although the controller is only measuring one of them. The circuit self regulates the two currents simultaneously with knowledge of only one of them.

Figure 6:
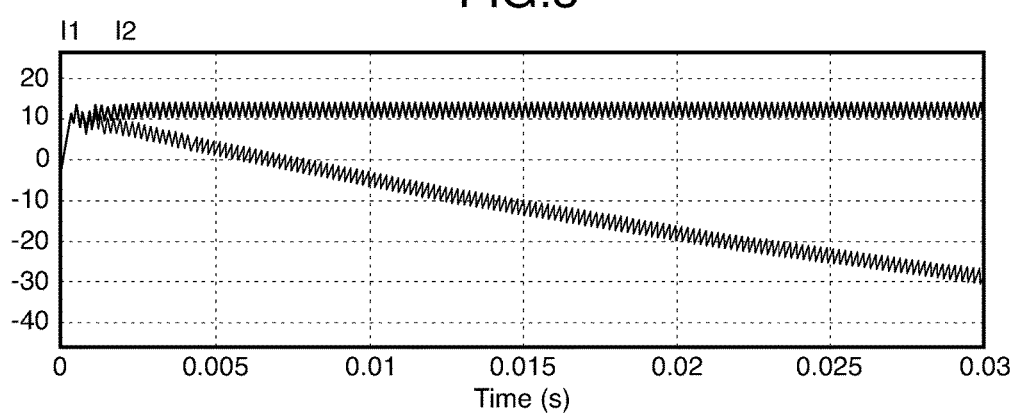
FIG. 6 is a similar to FIG. 5 of the circuit of FIG. 1.

FIG. 6 shows the result of the same simulation for the circuit in FIG. 3. This time the UE1 is only 5% higher than UE2, but the current in the positive branch inductor, which is not measured, goes out of control. The circuit in FIG. 4 would only operate with one controller and one feedback signal if the components on the positive and negative sides are identical. This is not achievable in practice.

Figure 7:
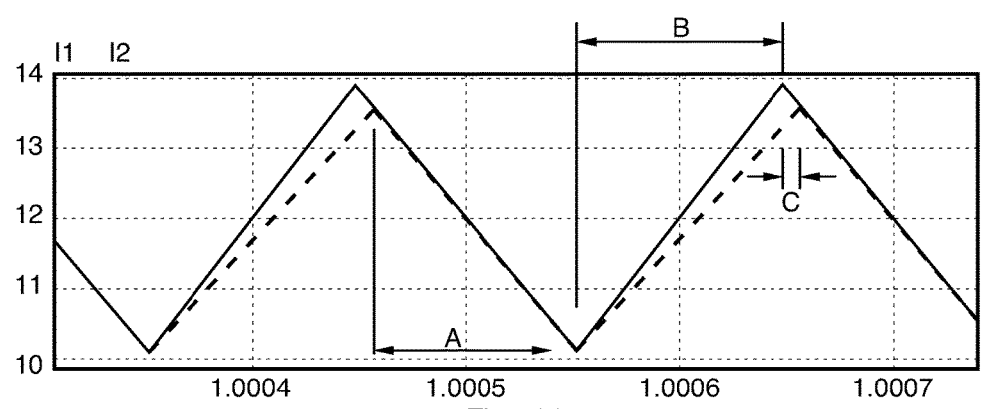
FIG. 7 is a plot of voltage vs. time showing the reset function of the circuit of FIG. 3.

FIG. 7 shows the "reset" function of the circuit in FIG. 3 that allows is balanced operation with a single controller. In this simulation, the inductance in the positive circuit is 20% higher than the inductance in the negative circuit which is a considerable unbalance in the circuit. The description of the waveform is as follows:

In every cycle, the ramping up of the current starts with the two inductors having the same current.

During the ramping up of the current, S2 is off and S1 and S3 are on.

The larger inductance results in slower current rise for L1 (I1) such that at the end of the current rising phase the current on L1 is clearly lower than the current in L2.

At that point, the switches S1 and S3 are turned off while S2 is turned on

The circuit then has a short time while the current in L1 continues increasing while the current in L2 decreases quickly. This is because one of the diodes (in this case the diode in anti-parallel with S1) turns on and energy is exchanged between the inductors through the high voltage source (UT1 in this case).

When the currents in both inductors are equal, the diode in anti-parallel with S1 turns off and the circuit operates with the two inductors in series. This self-reset function is what allows controlling the current in both subcircuits using one controller and same switching pattern to S1 and S3.

Variations

Figure 8:
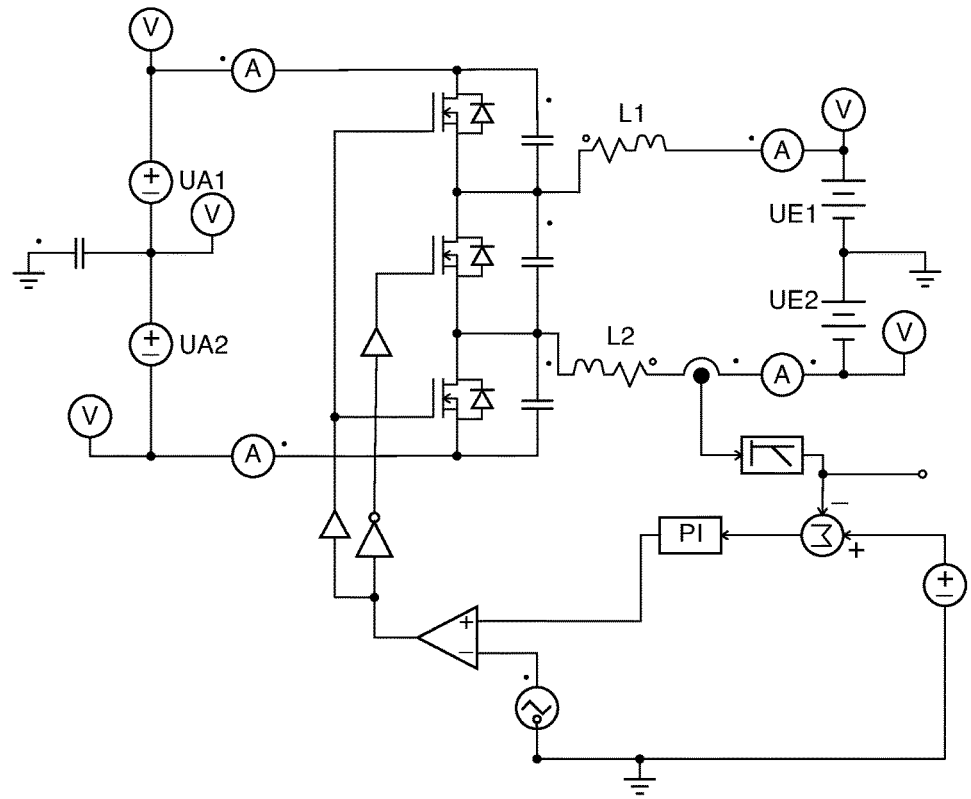
FIG. 8 is a view, similar to FIG. 3, showing a capacitor placed intermediate the two midpoints.

Although the circuit of FIG. 3 is able to control the current positive and negative with one controller, the difference in waveforms shown in FIG. 7 as a result of unbalances in the circuit results in slightly different currents flowing between the positive sources with respect to the current flowing between the negative sources. This may not be desirable in some applications where there is no external balancing or regulation of the sources. To solve this issue a component such as a capacitor can be placed in between the two midpoint references for the sources as shown in FIG. 8. The capacitor would naturally take a voltage that balances the current flowing between the positive and negative sources.

Figure 9:
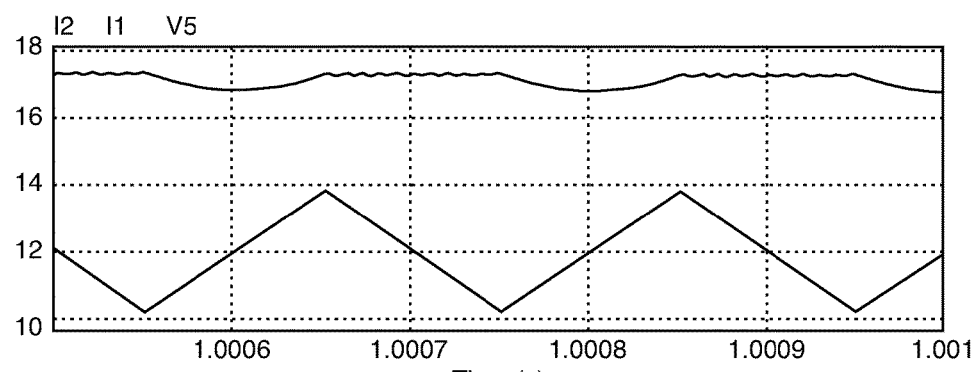
FIG. 9 is a plot, similar to FIG. 7, but with a 1 μF capacitor placed intermediate the two midpoints.

FIG. 9 shows the same case for FIG. 7 but with a 1 uF capacitor placed between the two mid-points. The plot also includes the voltage across the capacitor. Note that now the current in both inductors are identical and a voltage of about 17 V appears across the capacitor.

As another variation, by replacing the capacitor with a controllable voltage source, it is possible to adjust the difference in current flowing through the inductor that is not directly controlled with respect to the inductor that is directly controlled. If the voltage source can be controlled to be positive or negative, then the current on the upper circuit can be higher or lower than the current in the lower circuit. This is attractive in battery applications where the positive and negative battery banks are independent and it may be necessary to equalize the battery banks with different charges. The component between the two midpoints may be a simple capacitor, a battery, an ultracapacitor, an inductor or a more complex circuit able to store some energy. Because the current on the path between the two midpoints is small and the voltage necessary is only the amount of unbalance wanted in the circuit, the cost of the balancing component is low and its efficiency is high compared with the amount of power transferred.

The following table shows the result of simulations where the capacitor in FIG. 8 was replaced with a voltage source and how the current on the positive section of the circuit is controlled with the magnitude of this voltage.

| Voltage between midpoints | Current in L1 | Current in L2 |
|---|---|---|
| 0 V | 12.00 A | 12.00 A |
| 10 V | 12.07 A | 12.00 A |
| 20 V | 12.12 A | 12.00 A |
| −10 V | 11.93 A | 12.00 A |
| −20 V | 11.87 A | 12.00 A |

In practice, the voltage between the two midpoints can be controlled just by adding a delay (positive of negative) for switching off S1 with respect to S3. This can be easily implemented on a digital controller.

Figure 10:
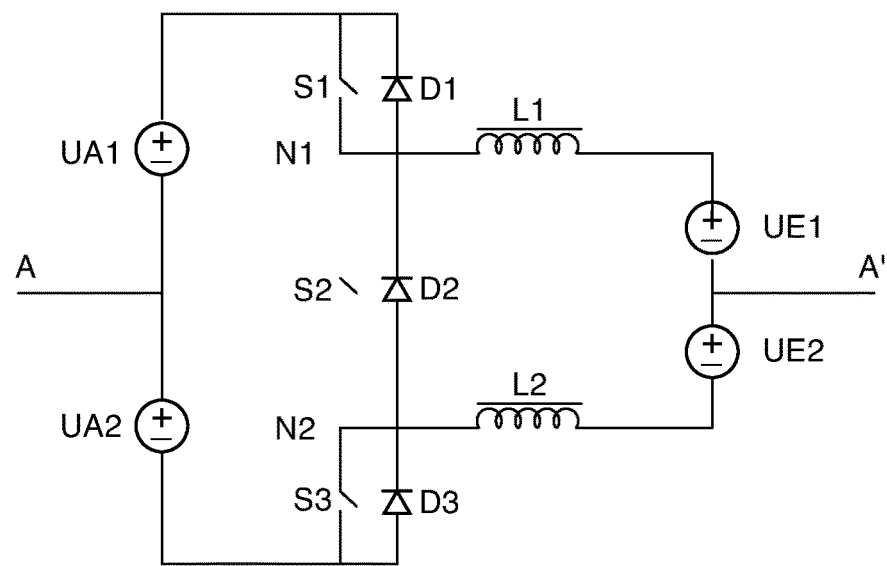
FIG. 10 is a buck converter embodiment of the invention.

The circuit in FIG. 2 can be modified to satisfy other non-isolated applications that use bipolar inputs and outputs. One of them is a unidirectional buck only circuit that can be used to transfer power from a bipolar source to a bipolar load operating at a lower voltage. The buck circuit is shown in FIG. 10 where S2 has been removed from FIG. 2 to provide only unidirectional power flow.

Figure 11:
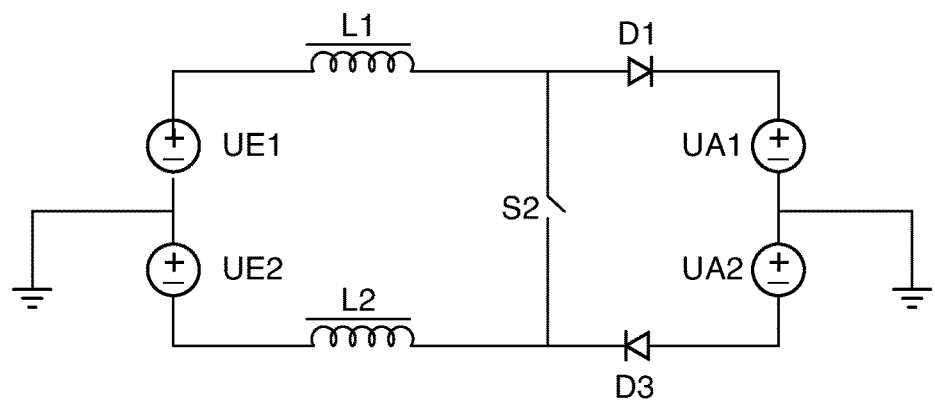
FIG. 11 is a boost converter embodiment of the invention.

The circuit can also be used in a unidirectional boost application where power is transferred from a bipolar source to a bipolar load operating at a higher voltage. The boost circuit is shown in FIG. 11 where S1, S3, and D2 have been removed from FIG. 2 to provide unidirectional power flow. In this case the circuit is shown with the midpoints grounded although it is not required.

Whereas several specific embodiments are herein shown and described, it will be evident to persons of ordinary skill that other variations are possible. Accordingly, the invention should be understood as limited only by the accompanying claims, purposively construed.

What is claimed is:

1. Method for transferring power between two DC circuits, the two DC circuits including a pair of buses, the pair of buses including a high voltage bus and a low voltage bus, each bus of the pair of buses having a neutral, a terminal with a positive voltage relative to the neutral and a terminal with a negative voltage relative to the neutral, the method comprising the steps of:
  transferring energy from one of the buses to a pair of storage inductors; and
  transferring energy from the pair of storage inductors to the other of the buses,
  wherein
  the pair of storage inductors and the pair of buses form part of a transfer circuit wherein
  the terminals of the low voltage bus are coupled to the pair of storage inductors such that one of such terminals is coupled to one of the pair of storage inductors and the other of such terminals is coupled to the other of the pair of storage inductors;
  the terminals of the high voltage bus are coupled to a pair of active switches such that one of such terminals is coupled to one of the pair of active switches and the other of such terminals is coupled to the other of the pair of active switches;
  the one of the pair of storage inductors is coupled to the one of the terminals of the low voltage bus and to a third switch;
  the other of the pair of storage inductors is coupled the other of the terminals of the low voltage bus and to the third switch;
  the pair of active switches and the third switch are arranged in series and define the entirety of the switches of the circuit; and
  there is no direct electrical connection between any terminal of the high voltage bus and any terminal of the low voltage bus.

2. The method according to claim 1 wherein the high voltage bus neutral and the low voltage bus neutral are not electrically the same point and are coupled to one another through an impedance.

3. The method according to claim 2, wherein the high voltage bus neutral and the low voltage bus neutral are coupled using one or more capacitors.

4. The method according to claim 1, wherein the third switch is an active switch and the active switches are bidirectional.

5. The method according to claim 1, wherein the high voltage bus neutral and/or the low voltage bus neutral are connected to ground.

6. The method according to claim 1, wherein a battery bank defines the high voltage bus or the low voltage bus.

7. The method according to claim 1, wherein a DC generating source or solar photovoltaic array defines the high voltage bus or the low voltage bus and the method is used to convert unidirectional power.

8. The method according to claim 7, wherein at least one of the active switches is defined by unidirectional active switches.

9. The method according to claim 1, wherein each of the storage inductors is defined by a plurality of inductors connected in parallel or in series to one another.

10. The method according to claim 1, wherein the plurality of inductors have associated storage and release configurations which are unequal to provide unequal currents in the two poles of the same bus.

11. The method according to claim 1, wherein one or more of the pair of active switches and the third switch is defined by a respective arrangement of multiple devices arranged in parallel or in series.

12. Method for transferring power between two DC circuits, the two DC circuits including a pair of buses, the pair of buses including a high voltage bus and a low voltage bus, the method comprising the steps of:
  transferring energy from one of the buses to a pair of storage inductors; and
  transferring energy from the pair of storage inductors to the other of the buses, wherein
  the pair of storage inductors and the pair of buses form part of a transfer circuit wherein
  the terminals of the low voltage bus are coupled to the pair of storage inductors such that one of such terminals is coupled to one of the pair of storage inductors and the other of such terminals is coupled to the other of the pair of storage inductors;

the terminals of high voltage bus are coupled to a pair of active switches such that one of such terminals is coupled to one of the pair of active switches and the other of such terminals is coupled to the other of the pair of active switches;

the one of the pair of storage inductors is coupled to the one of the terminals of the low voltage bus and to a third switch;

the other of the pair of storage inductors is coupled the other of the terminals of the low voltage bus and to the third switch;

the pair of active switches and the third switch are arranged in series and define the entirety of the switches of the circuit; and there is no direct electrical connection between any terminal of the high voltage bus and any terminal of the low voltage bus.

13. The method according to claim 12, wherein the active switches are bidirectional.

14. The method according to claim 12, wherein a battery bank defines the high voltage bus or the low voltage bus.

15. The method according to claim 12, wherein a DC generating source or solar photovoltaic array defines the high voltage bus or the low voltage bus and the method is used to convert unidirectional power.

16. The method according to claim 12, wherein at least one of the active switches is defined by unidirectional active switches.

17. The method according to claim 12, wherein each of the storage inductors is defined by a plurality of inductors connected in parallel or in series to one another.

18. The method according to claim 12, wherein the plurality of inductors have associated storage and release configurations which are unequal to provide unequal currents in the two poles of the same bus.

19. The method according to claim 12, wherein one or more of the pair of active switches and the third switch is defined by a respective arrangement of multiple devices arranged in parallel or in series.

* * * * *